United States Patent
Son et al.

(10) Patent No.: US 10,750,167 B2
(45) Date of Patent: Aug. 18, 2020

(54) INTRA-PREDICTION METHOD AND APPARATUS IN VIDEO CODING SYSTEM

(71) Applicant: LG ELECTRONICS INC., Seoul (KR)

(72) Inventors: Eunyong Son, Seoul (KR); Jin Heo, Seoul (KR); Seungwook Park, Seoul (KR); Sehoon Yea, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 200 days.

(21) Appl. No.: 15/768,992

(22) PCT Filed: Sep. 27, 2016

(86) PCT No.: PCT/KR2016/010804
§ 371 (c)(1),
(2) Date: Apr. 17, 2018

(87) PCT Pub. No.: WO2017/069419
PCT Pub. Date: Apr. 27, 2017

(65) Prior Publication Data
US 2018/0309984 A1     Oct. 25, 2018

Related U.S. Application Data

(60) Provisional application No. 62/245,253, filed on Oct. 22, 2015.

(51) Int. Cl.
*H04N 19/105*     (2014.01)
*H04N 19/11*      (2014.01)
(Continued)

(52) U.S. Cl.
CPC ........... *H04N 19/105* (2014.11); *H04N 19/11* (2014.11); *H04N 19/159* (2014.11);
(Continued)

(58) Field of Classification Search
CPC .................................................... H04N 19/105
(Continued)

(56) References Cited

U.S. PATENT DOCUMENTS

| | | | |
|---|---|---|---|
| 2013/0251036 A1* | 9/2013 | Lee | H04N 19/593 375/240.12 |
| 2013/0272623 A1* | 10/2013 | Jeon | H04N 19/593 382/238 |
| 2015/0063440 A1 | 3/2015 | Pang et al. | |

FOREIGN PATENT DOCUMENTS

| | | |
|---|---|---|
| EP | 2391129 A1 | 11/2011 |
| KR | 10-2011-0073263 A | 6/2011 |

(Continued)

*Primary Examiner* — Yulin Sun
(74) *Attorney, Agent, or Firm* — Dentons US LLP

(57) ABSTRACT

An image decoding method, which is performed by a decoding device according to the present invention, comprises the steps of: acquiring the information on an intra-prediction mode of a current block from a received bit stream; deriving neighboring reference samples of the current block; deriving a first prediction value for a current sample of the current block on the basis of the intra-prediction mode and the neighboring reference samples; deriving a second prediction value for the current sample on the basis of adjacent samples of the current sample; and deriving a prediction value for the current sample on the basis of the first prediction value and the second prediction value. According to the present invention, the intra-prediction value can be derived on the basis of the adjacent samples of the current sample within the present block, and the intra-prediction accuracy can be improved therethrough.

14 Claims, 7 Drawing Sheets

(51) Int. Cl.
  *H04N 19/593* (2014.01)
  *H04N 19/159* (2014.01)
  *H04N 19/176* (2014.01)
  *H04N 19/52* (2014.01)
  *H04N 19/196* (2014.01)

(52) U.S. Cl.
  CPC ........... *H04N 19/176* (2014.11); *H04N 19/52* (2014.11); *H04N 19/593* (2014.11); *H04N 19/196* (2014.11)

(58) Field of Classification Search
  USPC .................................................. 375/240.16
  See application file for complete search history.

(56) References Cited

FOREIGN PATENT DOCUMENTS

| | | |
|---|---|---|
| KR | 10-2012-0065953 A | 6/2012 |
| KR | 10-2013-0110127 A | 10/2013 |
| KR | 10-2013-0126928 A | 11/2013 |
| KR | 10-2015-0064406 A | 6/2015 |
| WO | 2012081895 A1 | 6/2012 |

\* cited by examiner

FIG. 3

$$\alpha \cdot P_{conv} + (1-\alpha) \cdot P_{inner} = P_{new}$$

$0 \leq \alpha \leq 1$,
$P_{conv}$ : PREDICTION WITHIN EXISTING SCREEN
$P_{inner}$ : PREDICTION WITHIN INNER PIXEL-BASED SCREEN

FIG. 4

|  |  |
|---|---|
| Rec (x-1, y-1) | Rec (x, y-1) |
| Rec (x-1, y) | $P_{innerA}$ (x, y) |

(a)

|  |  |
|---|---|
| Rec (x-1, y) | $P_{innerB}$ (x, y) |
| Rec (x-1, y+1) | Rec (x, y+1) |

(b)

|  |  |
|---|---|
| Rec (x, y-1) | Rec (x+1, y-1) |
| $P_{innerC}$ (x, y) | Rec (x+1, y) |

(c)

|  |  |
|---|---|
| $P_{innerD}$ (x, y) | Rec (x+1, y) |
| Rec (x, y+1) | Rec (x+1, y+1) |

INTRA-PREDICTION METHOD AND APPARATUS IN VIDEO CODING SYSTEM

CROSS-REFERENCE TO RELATED APPLICATIONS

This application is the National Stage filing under 35 U.S.C. 371 of International Application No. PCT/KR2016/010804, filed on Sep. 27, 2016, which claims the benefit of U.S. Provisional Application No. 62/245,253 filed on Oct. 22, 2015, the contents of which are all hereby incorporated by reference herein in their entirety.

BACKGROUND OF THE INVENTION

Field of the Invention

The present invention relates to a video coding technology, and more particularly, to an intra-prediction method and apparatus in a video coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

The present invention provides a method and an apparatus for increasing image coding efficiency.

The present invention also provides a method and an apparatus for enhancing efficiency of intra-prediction based coding.

The present invention also provides enhancing efficiency of intra-prediction based coding using a neighboring block of a current block and sample data in the current block.

The present invention also provides a method regarding a recovery order of samples in the current block in order to use the sample data in the current block.

In an aspect, an image decoding method performed by a decoding device is provided. The method includes acquiring the information on an intra-prediction mode of a current block from a received bit stream; deriving neighboring reference samples of the current block; deriving a first prediction value for a current sample of the current block on the basis of the intra-prediction mode and the neighboring reference samples; deriving a second prediction value for the current sample on the basis of adjacent samples of the current sample; and deriving a prediction value for the current sample on the basis of the first prediction value and the second prediction value.

In another aspect, a decoding device performing image decoding is provided. The device includes entropy decoder acquiring information on an intra-prediction mode of a current block from a received bitstream; and a predictor deriving neighboring reference samples of the current block, deriving a first prediction value for a current sample of the current block on the basis of the intra-prediction mode and the neighboring reference samples, deriving a second prediction value for the current sample on the basis of adjacent samples of the current sample, and deriving a prediction value for the current sample on the basis of the first prediction value and the second prediction value.

In yet another aspect, an image encoding method performed by an encoding device is provided. The method includes determining an intra prediction mode; deriving neighboring reference samples of the current block; deriving a first prediction value for a current sample on the basis of the intra-prediction mode and the neighboring reference samples; deriving a second prediction value for the current sample on the basis of adjacent samples of the current sample; generating a prediction value for the current sample on the basis of the first prediction value and the second prediction value; and encoding and outputting prediction mode information indicating the intra prediction mode for the current block.

In still yet another aspect, an encoding device performing image encoding is provided. The device includes a predictor determining an intra prediction mode; deriving neighboring reference samples of the current block, deriving a first prediction value for a current sample on the basis of the intra-prediction mode and the neighboring reference samples, deriving a second prediction value for the current sample on the basis of adjacent samples of the current sample, and generating a prediction value for the current sample on the basis of the first prediction value and the second prediction value; and an entropy encoder encoding and outputting prediction mode information indicating the intra prediction mode for the current block.

According to the present invention, an intra prediction value can be derived based on adjacent samples of a current sample in a current block, thereby enhancing intra prediction accuracy.

According to the present invention, the intra prediction value derived based on the adjacent samples can be obtained, thereby eliminating or reducing a data amount of a residual signal for a sample far from neighboring reference samples and enhancing overall coding efficiency.

According to the present invention, a reconstruction order of the samples in the current block can be changed according to an intra-block intra-prediction method and the intra-prediction efficiency can be enhanced.

According to the present invention, virtual reference samples can be generated and the virtual reference samples are included as adjacent samples of lower or right samples in the current block to enhance the intra prediction efficiency.

BRIEF DESCRIPTION OF THE DRAWINGS

FIG. 3 exemplarily illustrates a process of deriving a prediction sample by referring to neighboring reference samples and reconstruction samples in a current block.

FIG. 4 exemplarily illustrates locations of the reconstruction samples for intra-block intra prediction.

FIG. 5 exemplarily illustrates the neighboring reference samples of the current block having a size of N×N and generated virtual reference samples.

DESCRIPTION OF EXEMPLARY EMBODIMENTS

Figure 1:
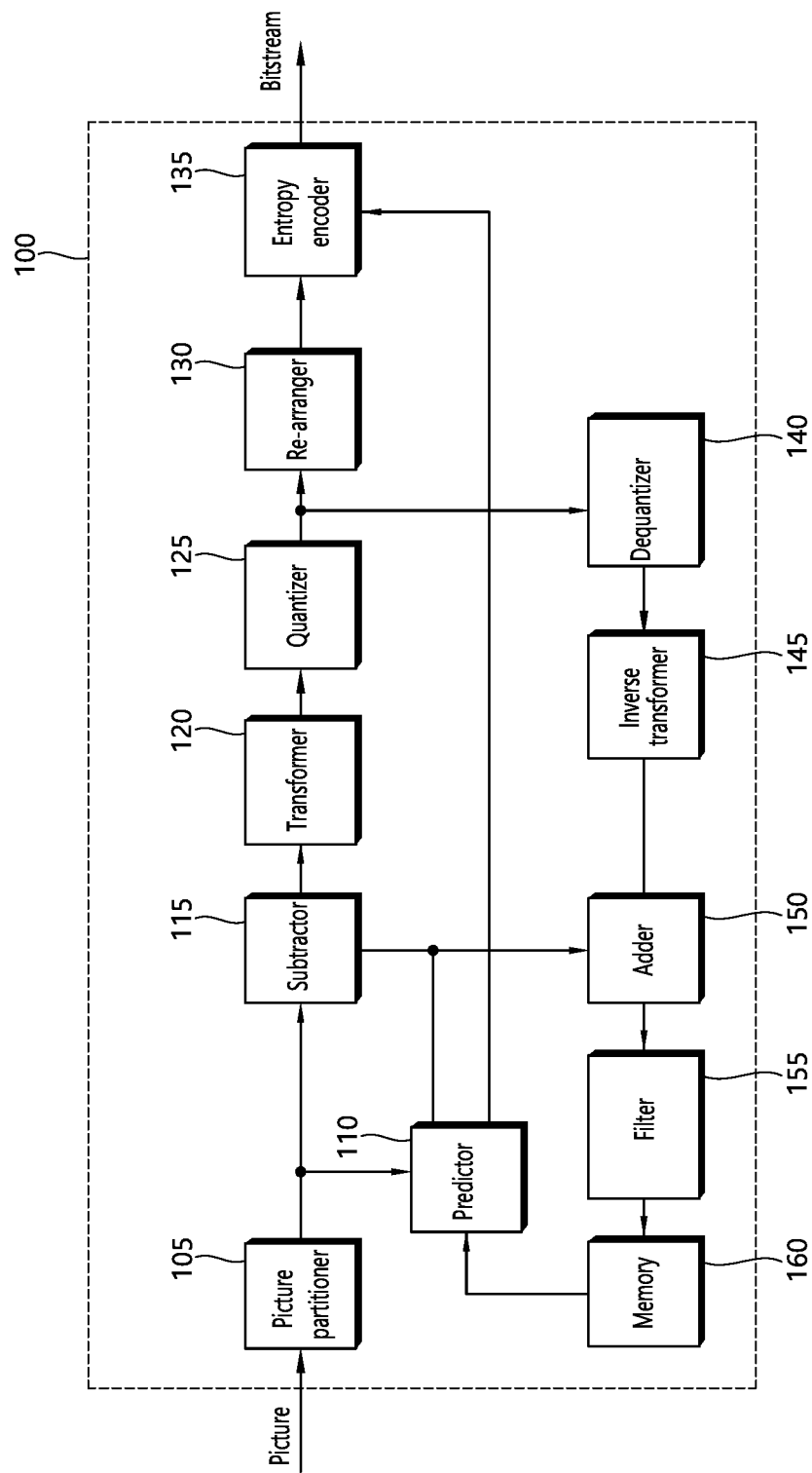
FIG. 1 is a block diagram schematically illustrating a video encoder according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoder according to an embodiment of the invention.

Referring to FIG. 1, a video encoder 100 includes a picture partitioner 105, a predictor 110, a transformer 115, a quantizer 120, a re-arranger 125, an entropy encoder 130, a dequantizer 135, an inverse transformer 140, a filter 145, and a memory 150.

The picture partitioner 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a lower depth as a quad-tree structures. The PU and TU may be obtained from the CU. For example, the PU may be partitioned from a CU into a symmetric or asymmetric square structure. Further, the TU may be split into a quad tree structure from the CU.

The predictor 110 includes an inter predictor that performs an inter prediction process and an intra predictor that performs an intra prediction process, as will be described later. The predictor 110 performs a prediction process on the processing units of a picture divided by the picture partitioner 105 to create a prediction block including a prediction sample or a prediction sample array. In the predictor 110, the processing unit of a picture may be a CU, a TU, or a PU. The predictor 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

The inter prediction may use a skip mode, a merge mode, or Advanced Motion Vector Prediction (AMVP). In the inter prediction, a reference picture may be selected for the PU, and a reference block corresponding to the PU may be selected. The reference block may be an integer pixel or sample unit, or a fractional pixel or sample unit. The prediction block is then generated for which the residual signal relative to the current PU is minimized and the motion vector size is minimized.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MDV, the motion vector predictor MVP, residual signal, etc., may be entropy encoded and then transmitted to the decoder. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample depending on the intra prediction mode and/or the size of a current block.

Residual values (a residual block or a residual signal) between the constructed prediction block and the original block are input to the transformer 115. The prediction mode information, the motion vector information, and the like used for the prediction are encoded along with the residual values by the entropy encoder 130 and are transmitted to the decoder.

The transformer 115 performs a transform process on the residual block in the unit of TUs and creates transform coefficients.

A transform block is a rectangular block of samples and is a block to which the same transform is applied. The transform block may be a TU and may have a quad-tree structure.

The transformer 115 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transformer 115 may construct a transform block of transform coefficients through the transform.

Specifically, the transformer unit 115 applies a primary transform of the residual signal (or the residual block) from a spatial domain to a frequency domain on the basis of the DST or the DCT to generate temporary transform coefficients (or primary transform coefficients) and applies rotational transform of the temporary transform coefficients as secondary transform to generate the transform coefficients (or secondary transform coefficients).

The quantizer 120 may quantize the residual values, that is, transform coefficients, transformed by the transformer 115 and may create quantization coefficients. The values calculated by the quantizer 120 may be supplied to the dequantizer 135 and the re-arranger 125.

The re-arranger 125 may rearrange the transform coefficients supplied from the quantizer 120. By rearranging the quantization coefficients, it is possible to enhance the encoding efficiency in the entropy encoder 130.

The re-arranger 125 may rearrange the quantized transform coefficients in the form of a two-dimensional block to the form of a one-dimensional vector through the use of a coefficient scanning method.

The entropy encoder 130 may be configured to entropy code the symbol according to a probability distribution based on the quantized transform values rearranged by the re-arranger 125 or the encoding parameter value calculated during the encoding process, etc. and then to output a bit stream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoder and passed to a decoder like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal can be called as a residual block in a block unit, and can be called as a residual sample in a sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential golomb, Context-Adaptive Variable Length Coding (CAVLC), and Context-Adaptive Binary Arithmetic Coding (CABAC) may be used for the entropy encoding. For example, the entropy encoder 130 may store therein a table for performing entropy encoding, such as a variable length coding/code (VLC) table. The entropy encoder 130 may perform entropy encoding using the stored VLC table. Further, the entropy encoder 130 derives a binarization method of a corresponding symbol and a probability model of a corresponding symbol/bin, and then performs entropy encoding using the derived binarization method or probability model.

The entropy encoder 130 may give a predetermined change to a parameter set or syntaxes to be transmitted, if necessary.

The dequantizer 135 dequantizes the values transform coefficients quantized by the quantizer 120. The inverse transformer 140 inversely transforms the values dequantized by the dequantizer 135.

The residual value or residual sample or residual sample array generated by the dequantizer 135 and the inverse-transformer 140, and the prediction block predicted by the predictor 110 may be combined to form a reconstructed block including a reconstructed sample or a reconstructed sample array.

In FIG. 1, a residual block and a prediction block are added to create a reconstructed block by an adder. At this time, the adder may be considered as a particular element reconstructed block generator that generates a reconstructed block.

The filter 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter 145 may not perform a filtering operation on the reconstructed block used in the inter prediction.

The memory 150 may store the reconstructed block or picture calculated by the filter 145. The reconstructed block or picture stored in the memory 150 may be supplied to the predictor 110 that performs the inter prediction.

Figure 2:
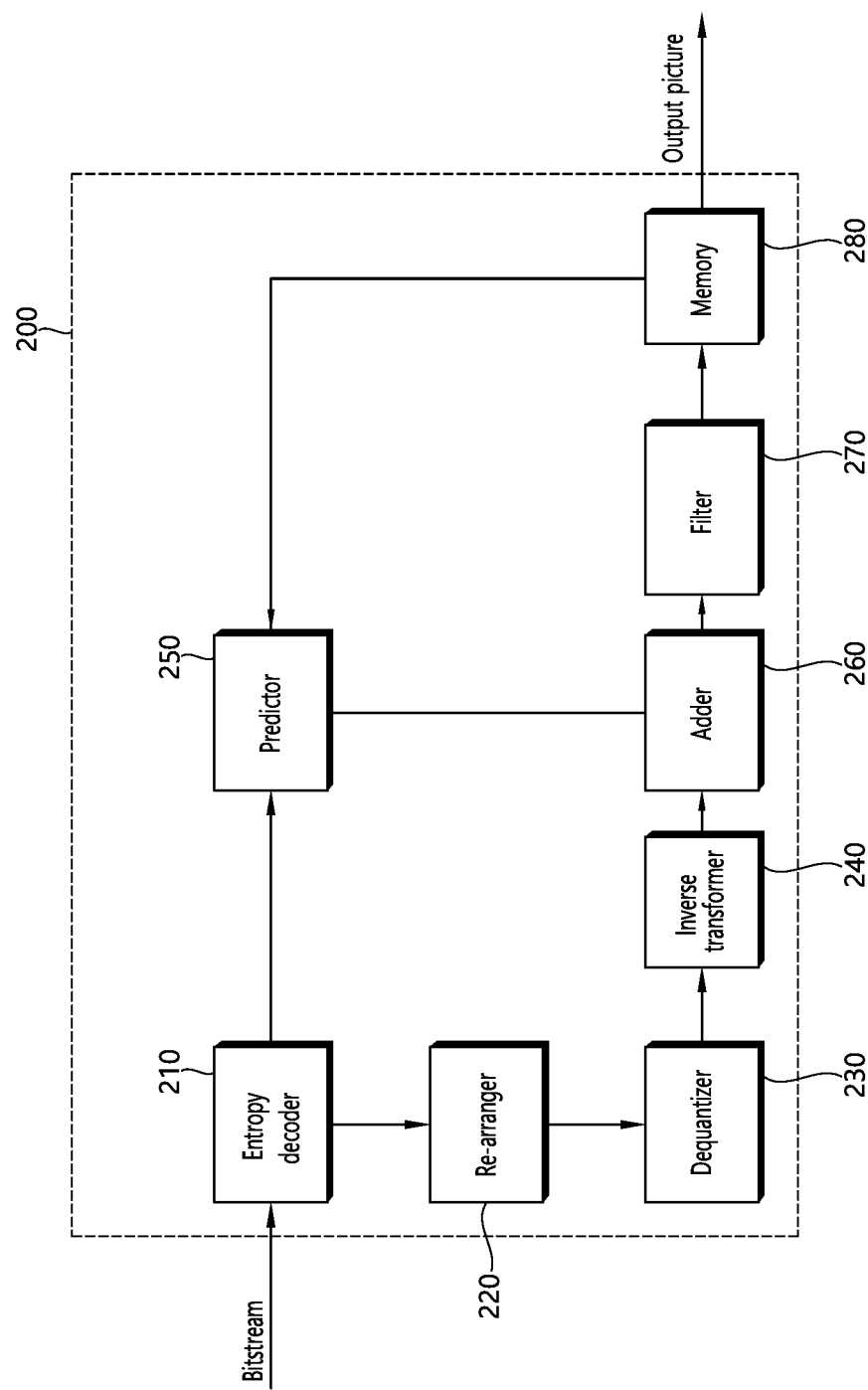
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 may include an entropy decoder 210, a re-arranger 215, a dequantizer 220, an inverse transformer 225, a predictor 230, a filter 235, and a memory 240.

When a video bitstream is input from the video encoder, the input bitstream may be decoded on the basis of the order in which video information is processed by the video encoder.

The entropy decoder 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoder, the entropy decoder 210 may perform decoding using the same VLC table as the encoder used in the encoder. Further, when CABAC is used to perform entropy encoding in a video encoder, the entropy decoder 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoder 210 may be supplied to the predictor 230, and the residual values, that is, the quantized transform coefficients, entropy-decoded by the entropy decoder 210 may be input to the re-arranger 215.

The re-arranger 215 may rearrange the bitstream information, that is, the quantized transform coefficients, entropy-decoded by the entropy decoder 210 on the basis of the rearrangement method in the video encoder.

The re-arranger 215 may reconstruct and rearrange the coefficients expressed in the form of a one-dimensional vector into coefficients in the form of a two-dimensional block. The re-arranger 215 may scan the coefficients on the basis of the prediction mode applied to the current block transform block and the size of the transform block and may create an array of coefficients quantized transform coefficients in the form of a two-dimensional block.

The dequantizer 220 may perform dequantization on the basis of the quantization parameters supplied from the video encoder and the coefficient values of the rearranged block.

The inverse transformer 225 may perform inverse rotational transform and inverse transform on the transform and rotational transform performed by the transformer of the encoding device with respect to a quantization result performed in the video encoding device.

The inverse rotational transform and the inverse transform may be performed based on a transmission unit or a division unit of the image determined in the encoding device. The transformer of the encoding device may selectively perform the DCT and/or DST according to a plurality of information including a prediction method, a size of the current block and a prediction direction, and the like and the inverse transformer of the decoding device may perform the inverse rotational transform and the inverse transform based on transform information performed by the transformer of the encoding device. The inverse rotational transform and the inverse transform may be simply referred to as rotational transformation and transform in terms of the decoding device 200.

The predictor 230 generates a prediction block including a prediction sample or a prediction sample array based on the prediction block generation-related information provided by the entropy decoder 210 and the previously decoded block and/or picture information provided from the memory 240.

If the prediction mode for the current PU is the intra prediction mode, the predictor 230 may perform the intra prediction to generate a prediction block based on pixel information in the current picture.

If the prediction mode for the current PU is the inter prediction mode, the predictor 230 may be configured to perform inter prediction on a current PU based on information included in at least one picture of a previous picture or a subsequent picture to the current picture. In this connection, information about the motion information necessary for inter prediction of the current PU provided in the video encoder, such as motion vector and reference picture index may be deduced via checking the skip flag and merge flag received from the encoder.

The predictor 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

In one example, when the merge mode is applied, the encoder and decoder may generate a merge candidate list using a motion vector for a reconstructed spatial neighboring block and/or is a motion vector corresponding to a Col block as a temporal neighboring block. In the merge mode, a motion vector of a candidate block selected from the merge candidate list is used as a motion vector of a current block. The encoder may transmit to the decoder a merge index indicating a candidate block having an optimal motion vector as selected from candidate blocks included in the merge candidate list. In this connection, the decoder may derive a motion vector for the current block using the merge index.

In another example, when the AMVP (Advanced Motion Vector Prediction) mode is applied, the encoder and decoder generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoder may transmit to the decoder a prediction motion vector index indicating the optimal motion vector selected from among the motion vector candidates included in the motion vector predictor candidate list. In this connection, the decoder may select the prediction motion vector for the current block from the motion vector candidates included in the motion vector candidate list using the motion vector index.

The encoder may obtain the motion vector difference MVD between the motion vector for the current block and the motion vector predictor, encode the MVD, and transmit the encoded MVD to the decoder. That is, the MVD may be a value obtained by subtracting the motion vector predictor (MVP) from the motion vector (MV) for the current block. In this connection, the decoder may decode the received motion vector difference, and derive the motion vector for the current block via addition between the decoded motion vector difference and the motion vector predictor.

Further, the encoder may transmit a reference picture index indicating a reference picture to the decoder.

The decoder may predict the motion vector of the current block using the motion information of the neighboring block and derive the motion vector of the current block using the residual received from the encoder. The decoder may generate the prediction block for the current block based on the derived motion vector and the reference picture index information received from the encoder.

In another example, when the merge mode is applied, the encoder and decoder may generate a merge candidate list using the motion information of the reconstructed neighboring block and/or the motion information of the Col block. That is, when the reconstructed neighboring block and/or the motion information of the Col block exists, the encoder and decoder may use the reconstructed neighboring block and/or the motion information of the Col block as a merge candidate for the current block.

The encoder may select a merge candidate that provides optimal encoding efficiency among the merge candidates included in the merge candidate list as the motion information for the current block. In this connection, a merge index indicating the selected merge candidate may be included in the bitstream which is transmitted to the decoder. The decoder may select one of the merge candidates included in the merge candidate list using the transmitted merge index, and the decoder may determine the selected merge candidate as motion information of the current block. Therefore, when the merge mode is applied, the motion information of the reconstructed neighboring block and/or the Col block may be used as the motion information for the current block as it is. The decoder may reconstruct the current block by adding the prediction block and the residual transmitted from the encoder to each other.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoder does not transmit syntax information such as the residual to the decoder in addition to information indicating which blocks motion information to use as the motion information for the current block.

The encoder and the decoder may generate a prediction block of the current block by performing motion compensation on the current block based on the derived motion information. In this connection, a prediction block may refer to a motion-compensated block as generated by performing motion compensation on the current block. Further, a plurality of motion compensated blocks may constitute a single motion compensated image.

The reconstructed block may be generated using the prediction block generated by the predictor 230 and the residual block provided by the inverse-transformer 225. FIG. 2 illustrates that using the adder, the prediction block and the residual block are combined to generate the reconstructed block. In this connection, the adder may be viewed as a separate element (a reconstructed block generator) that is configured to generate the reconstructed block. In this connection, the reconstructed block includes a reconstructed sample or a reconstructed sample array as described above; the prediction block includes a prediction sample or a prediction sample array; the residual block may include a residual sample or a residual sample array. Therefore, the reconstructed sample or the reconstructed sample array can be considered to be generated by combining the corresponding prediction sample or prediction sample array with the corresponding residual sample or residual sample array.

For a block that the skip mode is applied, the residual signal may not be transmitted and the predicted block may be used as a reconstructed block.

The reconstructed block and/or picture may be supplied to the filter 235. The filter 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output module.

The elements that is directly related to decoding images among the entropy decoder 210, the re-arranger 215, the dequantizer 220, the inverse transformer 225, the predictor 230, the filter 235 and the memory 240 which are included in the video decoder 200, for example, the entropy decoder 210, the re-arranger 215, the dequantizer 220, the inverse transformer 225, the predictor 230, the filter 235, and so on may be expressed as a decoder or a decoding unit that is distinguished from other elements.

In addition, the video decoder 200 may further include a parsor not shown in the drawing that parses information related to the encoded images included in a bitstream. The parsor may include the entropy decoder 210, and may be included in the entropy decoder 210. Such a parsor unit may also be implemented as an element of the decoding unit.

As described above, when the intra prediction mode is applied to the current block in the current video coding system, intra prediction for generating the prediction block based on the neighboring reference samples of the current block may be performed. In this case, the prediction accuracy for the sample in the current block located close to the reference sample used for the intra prediction may be high, while the prediction accuracy for the sample in the current block far away from the reference sample may be low. For example, in some cases, the residual value for the sample in the current block located close to the reference sample may be close to 0, but the residual value for the sample in the current block, which is far from the reference sample and in this case, the coding efficiency may be lowered. In addition, according to the direction characteristic of the intra prediction, discontinuous edges may occur in prediction values between the adjacent samples in the current block. The discontinuous edges may affect the residual signal and degrade the transform efficiency. In the present invention, when the intra prediction is performed, not only the neighboring reference samples of the current block but also the previously predicted samples in the current block are reconstructed and the reconstructed samples are referred to so as to predict the target sample (or the current sample), and as a result, the accuracy of the intra prediction is increased and the discontinuous edges are alleviated to enhance the coding efficiency.

FIG. 3 exemplarily illustrates a process of deriving a prediction sample by referring to neighboring reference samples and reconstruction samples in a current block.

Referring to FIG. 3, a prediction value $P_{new}$ for the current sample may be derived from $P_{conv}$ derived by performing the intra prediction on the basis of the neighboring reference samples of the current block and $P_{inner}$ derived by performing the intra prediction (intra-block intra prediction) on the basis of the reconstruction samples in the current block. The prediction value obtained by performing the intra prediction on the basis of the neighboring reference samples may be referred to as a first prediction value and the prediction value obtained by performing the intra-block intra prediction may be referred to as a second prediction value. As illustrated in FIG. 3, the $P_{new}$ may be obtained as a weighted sum of the $P_{conv}$ derived based on the neighbor reference samples and the $P_{inner}$ derived based on the reconstruction samples in the current block. The $P_{new}$ may be derived based on the following equation.

$$\alpha * P_{conv} + (1-\alpha) * P_{inner} = P_{new} \quad \text{[Equation 1]}$$

Herein, $\alpha$ represents a weight for generating $P_{new}$. $\alpha$ may be a fixed constant value or may have a different value depending on the intra prediction mode or the size of the current block.

The reconstruction samples in the current block for deriving the $P_{inner}$ may include samples at various locations. A reconstruction order of the samples in the current block may vary depending on a method for deriving the $P_{inner}$, that is, the reconstruction samples in the current block used for the intra-block intra prediction.

FIG. 4 exemplarily illustrates locations of the reconstruction samples for intra-block intra prediction.

Referring to FIG. 4A, the adjacent samples of the current sample illustrated in FIG. 4A may be used for the intra prediction in the current block. Specifically, when a coordinate of the current sample is (x, y), the intra-block intra prediction may be performed based on Rec(x−1, y−1) which is the reconstruction sample of coordinate (x−1, y−1), Rec(x, y−1) which is the reconstruction sample of coordinate (x, y−1), and Rec(x−1, y) which is the reconstruction sample of coordinate (x−1, y). The second prediction value $P_{innerA}(x, y)$ may be derived by performing the intra prediction in the current block based on the reconstruction samples. The $P_{innerA}(x, y)$ may be derived based on the following equation.

$$P_{innerA}(x,y) = (A_a * Rec(x-1,y-1) + A_b * Rec(x,y-1) + A_c * Rec(x-1,y) + (A_a + A_b + A_c)/2) / (A_a + A_b + A_c) \quad \text{[Equation 2]}$$

Herein, $P_{innerA}(x, y)$ represents the second prediction value having a sample position (x, y) in the current block, and Rec(x−1, y−1), Rec(x, y−1), and Rec(x−1, y) represent a reconstruction value of the sample of the coordinate (x−1, y−1), the reconstruction value of the sample of the coordinate (x, y−1), and the reconstruction value of the sample of the coordinate (x−1, y), respectively and $A_a$, $A_b$, and $A_c$ represent the weights for deriving the second prediction value. $A_a$, $A_b$, and $A_c$ may adopt a predetermined constant value or may adopt different values depending on the intra prediction mode or the size of the current block. The encoding device transmits additional side information to the decoding device to determine the intra prediction mode in the current block and the weights.

Referring to FIG. 4B, the adjacent samples of the current sample illustrated in FIG. 4B may be used for the intra prediction in the current block. Specifically, when the coordinate of the current sample is (x, y), the intra-block intra prediction may be performed based on Rec(x−1, y) which is the reconstruction sample of the coordinate (x−1, y), Rec(x−1, y+1) which is the reconstruction sample of the coordinate (x−1, y+1), and Rec(x, y+1) which is the reconstruction sample of the coordinate (x, y+1). The second prediction value $P_{innerB}(x, y)$ may be derived by performing the intra prediction in the current block based on the reconstruction samples. The $P_{innerB}(x, y)$ may be derived based on the following equation.

$$P_{innerB}(x,y) = B_a * Rec(x-1,y) + B_b * Rec(x-1,y+1) + (B_c * Rec(x,y+1) + (B_a + B_b + B_c)/2) / (B_a + B_b + B_c) \quad \text{[Equation 3]}$$

Herein, $P_{innerB}(x, y)$ represents the second prediction value having the sample position (x, y) in the current block, and Rec(x−1, y), Rec(x−1, y+1), and Rec(x, y+1) represent the reconstruction value of the sample of the coordinate (x−1, y), the reconstruction value of the sample of the coordinate (x−1, y+1), and the reconstruction value of the sample of the coordinate (x, y+1), respectively and $B_a$, $B_b$, and $B_c$ represent the weights for deriving the second prediction value. $B_a$, $B_b$, and $B_c$ may adopt the predetermined constant value or may adopt different values depending on the intra prediction mode or the size of the current block. The encoding device transmits additional side information to the decoding device to determine the intra prediction mode in the current block and the weights.

Referring to FIG. 4C, the adjacent samples of the current sample illustrated in FIG. 4C may be used for the intra prediction in the current block. Specifically, when the coordinate of the current sample is (x, y), the intra-block intra prediction may be performed based on Rec(x, y−1) which is the reconstruction sample of the coordinate (x, y−1), Rec(x+1, y−1) which is the reconstruction sample of the coordinate (x+1, y−1), and Rec(x+1, y) which is the reconstruction sample of the coordinate (x+1, y). The second prediction value $P_{innerC}(x, y)$ may be derived by performing the intra prediction in the current block based on the reconstruction samples. The $P_{innerC}(x, y)$ may be derived based on the following equation.

$$P_{innerC}(x,y) = (C_a * Rec(x,y-1) + C_b * Rec(x+1,y-1) + C_c * Rec(x+1,y) + (C_a + C_b + C_c)/2) / (C_a + C_b + C_c) \quad \text{[Equation 4]}$$

Herein, $P_{innerC}(x, y)$ represents the second prediction value having the sample position (x, y) in the current block, and Rec(x, y−1), Rec(x+1, y−1), and Rec(x+1, y) represent the reconstruction value of the sample of the coordinate (x, y−1), the reconstruction value of the sample of the coordinate (x+1, y−1), and the reconstruction value of the sample of the coordinate (x+1, y), respectively and $C_a$, $C_b$, and $C_c$ represent the weights for deriving the second prediction value. $C_a$, $C_b$, and $C_c$ may adopt the predetermined constant value or may adopt different values depending on the intra prediction mode or the size of the current block. The encoding device transmits the additional side information to the decoding device to determine the intra prediction mode in the current block and the weights.

Referring to FIG. 4D, the adjacent samples of the current sample illustrated in FIG. 4D may be used for the intra prediction in the current block. Specifically, when the coordinate of the current sample is (x, y), the intra-block intra prediction may be performed based on Rec(x+1, y) which is the reconstruction sample of the coordinate (x+1, y), Rec(x, y+1) which is the reconstruction sample of the coordinate (x, y+1), and Rec(x+1, y+1) which is the reconstruction sample of the coordinate (x+1, y+1). The second prediction value $P_{innerD}(x, y)$ may be derived by performing the intra prediction in the current block based on the reconstruction samples. The $P_{innerD}(x, y)$ may be derived based on the following equation.

$$P_{innerD}(x,y) = (D_a * Rec(x+1,y) + D_b * Rec(x,y+1) + D_c * Rec(x+1,y+1) + (D_a + D_b + D_c)/2) / (D_a + D_b + D_c) \quad \text{[Equation 5]}$$

Herein, $P_{innerD}(x, y)$ represents the second prediction value having the sample position (x, y) in the current block, and Rec(x+1, y), Rec(x, y+1), and Rec(x+1, y+1) represent the reconstruction value of the sample of the coordinate (x+1, y), the reconstruction value of the sample of the coordinate (x, y+1), and the reconstruction value of the sample of the coordinate (x+1, y+1), respectively and $D_a$, $D_b$, and $D_c$ represent the weights for deriving the second prediction value. $D_a$, $D_b$, and $D_c$ may adopt the predetermined constant value or may adopt different values depending on the intra prediction mode or the size of the current block. The encoding device transmits the additional side information to the decoding device to determine the intra prediction mode in the current block and the weights.

When intra-block intra prediction is used as described above, the adjacent samples used in the intra prediction in the current block may be first reconstructed when the intra-block intra prediction is used. That is, the adjacent samples located in the current block may be reconstructed before the second prediction value for the current sample is derived. In this case, the reconstruction sample may be generated by adding the residual sample to the sample predicted earlier than the current sample in the current block without waiting until all prediction samples in the current block are derived and the reconstruction sample in the current block may be used for predicting the current sample.

As illustrated in FIGS. 4A to 4D, the reconstruction samples to be used for the intra-block intra prediction may be different and the reconstruction order of the samples in the current block may vary depending on each case.

When left, upper left, and upper adjacent samples of the current sample are used as illustrated in FIG. 4A, the reconstruction order of the samples in the current block may be based on a raster scan order. That is, an upper row in the current block is sequentially reconstructed to a lower row and the samples may be sequentially reconstructed from a left sample to a right sample in each row. As a specific example, when the coordinate of the current sample is (x, y), Rec(x−1, y−1) may be reconstructed earlier than Rec(x, y−1) and Rec(x, y−1) may be reconstructed earlier than Rec(x−1, y) among the adjacent samples described above. When the coordinate of the upper left sample position in the current block is (0, 0), the reconstruction order may be indicated as a pseudo code as shown in Table 1 below.

TABLE 1

```
for (int y=0; y<BlkHeight; y++)
  for (int x=0; x<BlkWidth; x++)
    Rec(x,y) = Pnew(x,y) + Resi(x,y)
```

Herein, int x and int y represent an x-coordinate value and a y-coordinate value of the first sample in the reconstruction order (i.e., upper left sample having coordinate (0, 0)), respectively, BlkWidth and BlkHeight represent a width and a height of the current block, respectively, Rec(x, y) represents the reconstruction value of the sample of the coordinate (x, y) in the current block, Pnew(x, y) represents the prediction value of the sample, and Resi(x, y) represents the residual value for the sample of the coordinate (x, y) in the current block. When the reconstruction of the samples in each current block is performed in the order of an index of a loop indicated by the pseudo code in Table 1, the intra prediction may be performed without a dependency problem between the samples according to the intra-block intra prediction method.

When the left, lower left, and lower adjacent samples of the current sample are used as illustrated in FIG. 4B, the samples in the current block are sequentially reconstructed to the upper row from the lower row in the current block and may be sequentially reconstructed from the left sample to the right sample in each row. As the specific example, when the coordinate of the current sample is (x, y), Rec(x−1, y+1) may be reconstructed earlier than Rec(x, y+1) and Rec(x, y+1) may be reconstructed earlier than Rec(x−1, y) among the adjacent samples described above. Such a reconstruction scheme may be referred to as a horizontally inversed raster scan order. When the coordinate of the upper left sample position in the current block is (0, 0), the reconstruction order may be indicated as the pseudo code as shown in Table 2 below.

TABLE 2

```
for (int y=BlkHeight−1; y>=0; y−−)
  for (int x=0; x<BlkWidth; x++)
    Rec(x,y) = Pnew(x,y) + Resi(x,y)
```

Herein, int x and int y represent the x-coordinate value and the y-coordinate value of the first sample in the reconstruction order (i.e., lower left sample having coordinate (0, BlkHeight−1)), respectively, BlkWidth and BlkHeight represent the width and the height of the current block, respectively, Rec(x, y) represents the reconstruction value of the sample of the coordinate (x, y) in the current block, Pnew(x, y) represents the prediction value of the sample, and Resi(x, y) represents the residual value for the sample of the coordinate (x, y) in the current block. When the reconstruction of the samples in each current block is performed in the order of the index of the loop indicated by the pseudo code in Table 2, the intra prediction may be performed without the dependency problem between the samples according to the intra-block intra prediction method.

When the upper, upper right, and right adjacent samples of the current sample are used as illustrated in FIG. 4C, the samples in the current block are sequentially reconstructed to the lower row from the upper row in the current block and may be sequentially reconstructed from the right sample to the left sample in each row. As the specific example, when the coordinate of the current sample is (x, y), Rec(x+1, y−1) may be reconstructed earlier than Rec(x, y−1) and Rec(x, y−1) may be reconstructed earlier than Rec(x+1, y) among the adjacent samples described above. Such a reconstruction scheme may be referred to as a vertically inversed raster scan order. When the coordinate of the upper left sample position in the current block is (0, 0), the reconstruction order may be indicated as the pseudo code as shown in Table 3 below.

TABLE 3

```
for (int y=0; y<BlkHeight; y++)
  for (int x=BlkWidth−1; x>=0; x−−)
    Rec(x,y) = Pnew(x,y) + Resi(x,y)
```

Herein, int x and int y represent an x-coordinate value and a y-coordinate value of the first sample in the reconstruction order (i.e., upper right sample having coordinate (BlkWidth−1, 0)), respectively, BlkWidth and BlkHeight represent the width and the height of the current block, respectively, Rec(x, y) represents the reconstruction value of the sample of the coordinate (x, y) in the current block, Pnew(x, y) represents the prediction value of the sample, and Resi(x, y) represents the residual value for the sample of the coordinate (x, y) in the current block. When the reconstruction of the samples in each current block is performed in the order of the index of the loop indicated by the pseudo code in Table 3, the intra prediction may be performed without the dependency problem between the samples according to the intra-block intra prediction method.

When the right, lower right, and lower adjacent samples of the current sample are used as illustrated in FIG. 4D, the samples in the current block are sequentially reconstructed to the upper row from the lower row in the current block and may be sequentially reconstructed from the right sample to the left sample in each row. As the specific example, when the coordinate of the current sample is (x, y), Rec(x+1, y+1) may be reconstructed earlier than Rec(x, y+1) and Rec(x, y+1) may be reconstructed earlier than Rec(x+1, y) among the adjacent samples described above. Such a reconstruction scheme may be referred to as an inversed raster scan order. When the coordinate of the upper left sample position in the current block is (0, 0), the reconstruction order may be indicated as the pseudo code as shown in Table 4 below.

TABLE 4 for (int y=BlkHeight−1; y>=0; y−−)
  for (int x=BlkWidth−1; x>=0; x−−)
    Rec(x,y) = Pnew(x,y) + Resi(x,y)

Herein, int x and int y represent the x-coordinate value and the y-coordinate value of the first sample in the reconstruction order (i.e., lower right sample having coordinate (BlkWidth−1, BlkHeight−1)), respectively, BlkWidth and BlkHeight represent the width and the height of the current block, respectively, Rec(x, y) represents the reconstruction value of the sample of the coordinate (x, y) in the current block, Pnew(x, y) represents the prediction value of the sample, and Resi(x, y) represents the residual value for the sample of the coordinate (x, y) in the current block. When the reconstruction of the samples in each current block is performed in the order of the index of the loop indicated by the pseudo code in Table 4, the intra prediction may be performed without the dependency problem between the samples according to the intra-block intra prediction method.

Meanwhile, when the intra prediction is performed based on at least one of the right, lower, and lower right adjacent samples of the current sample as illustrated in FIGS. 4B to 4D, virtual reference samples may be generated. For example, the current sample may be adjacent to a right or lower boundary of the current block. In this case, the right, lower, or lower right sample of the current sample may not be reconstructed in some cases. In this case, the virtual reference samples may be generated for use as the right, lower, or lower right sample of the current sample.

Figure 5:
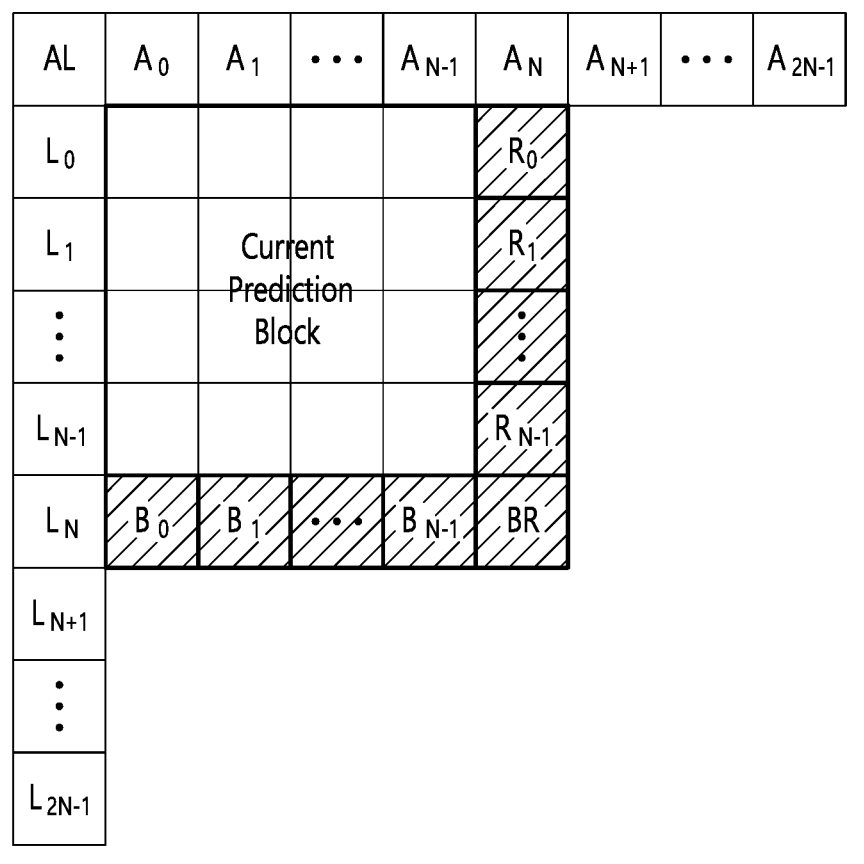

FIG. 5 exemplarily illustrates the neighboring reference samples of the current block having a size of N×N and generated virtual reference samples. However, this is an example and the width and the height of the current block may be different from each other.

Referring to FIG. 5, the virtual reference samples are generated at locations indicated by $B_0$ through $B_{N-1}$, $R_0$ through $R_{N-1}$, and BR. The virtual reference samples $B_0$ through $B_{N-1}$, $R_0$ through $R_{N-1}$, and BR may be derived based on the neighboring reference samples of the current block. That is, the virtual reference samples may be derived based on AL, $A_0$ to $A_{2N-1}$, and $L_0$ to $L_{2N-1}$. The virtual reference samples may be derived based on the following equation.

$$BR = (A_{2N-1} + L_{2N-1})/2 \quad \text{[Equation 6]}$$

$$B_x = L_N + diff_B \cdot (x+1), diff_B = \frac{BR - L_N}{(N+1)}$$

$$R_y = A_N + diff_R \cdot (y+1), diff_R = \frac{BR - A_N}{(N+1)}$$

Where BR represents the virtual reference sample of coordinate (N, N), Bx represents the virtual reference sample of coordinate (x, N), Ry represents the virtual reference sample of coordinate (N, y), Ax represents a neighboring reference sample of coordinate (x, −1), and Ly represents the neighboring reference sample of coordinate (−1, y). The virtual reference samples generated by the above method may be used one or more of the above-mentioned adjacent samples when deriving the second prediction values shown in the method of FIGS. 4B to 4D. That is, the virtual reference samples can be used as an Rec(m, n) value of the adjacent sample when the second prediction values for the right samples and the lower samples in the current block.

Meanwhile, the encoding device may transmit an inner prediction flag to the decoding device. The encoding device may transmit information indicating whether to apply a prediction that derives the second prediction value of the current sample through the inner prediction flag. For example, when the value of the inner prediction flag is 1, the second prediction value of the current sample may be derived. For example, when the value of the inner prediction flag is 0, the second prediction value of the current sample is not derived and the first prediction value may be derived as a prediction value for the current sample. The inner prediction flag may be transmitted through a syntax shown in Table 5 below.

TABLE 5

| coding unit( x0, y0, log2CbSize ) { | Descriptor |
|---|---|
| if( transquant bypass enabled flag ) | |
|   cu transquant bypass flag | ae(v) |
| if( slice type != I ) | |
|   cu skip flag[ x0 ][ y0 ] | ae(v) |
| nCbS − ( 1 << log2CbSize ) | |
| if( cu skip flag[ x0 ][ y0 ] ) | |
|   prediction unit( x0, y0, nCbS, nCbS ) | |
| else { | |
|   if( slice type != I ) | |
|     pred mode flag | ae(v) |
|   if( CuPredMode[ x0 ][ y0 ] != MODE_INTRA | | |
| log2CbSize − − MinCbLog2Size Y ) | |
|     part mode | ae(v) |
|   if( CuPredMode[ x0 ][ y0 ] = = MODE INTRA ) { | |
|     if( PartMode = = PART 2N×2N && pcm enabled | |
|     flag && | |
|       log2CbSize >− Log2MinIpcmCbSizeY && | |
|       log2CbSize <− Log2MaxIpcmCbSizeY ) | |
|     pcm flag [ x0 ][ y0 ] | ae(v) |
|   if( pcm flag[ x0 ][ y0 ] ) { | |
|     while( !byte aligned( ) ) | |
|       pcm alignment zero bit | f(1) |
|     pcm sample( x0, y0, log2CbSize ) | |
|   } else { | |
|     pbOffset = ( PartMode = = PART N×N ) ? | |
|     ( nCbS / 2 ) : nCbS | |
|     for ( j = 0; j < nCbS; j = j − pbOffset ) | |
|       for(i = 0; i < nCbS; i = i + pbOffset ) | |
|         prev_intra_luma_pred_flag[ x0 − i ] | |
|         [ y0 + j ] | ae(v) |

TABLE 5-continued

```
coding unit( x0, y0, log2CbSize ) {                                    Descriptor
        for( j = 0; j < nCbS; j = j - pbOffset )
            for( i = 0; i < nCbS; i = i + pbOffset )
                if( prev intra luma pred flag[ x0 - i ][ y0 + j ] )
                    mpm_idx[ x0 + i ][ y0 + j ]                        ae(v)
                else
                    rem_intra_luma_pred_mode[ x0 + i ]                 ae(v)
                    [ y0 + j ]
        for( j = 0; j < nCbS; j = j - pbOffset )
            for ( i = 0; i < nCbS; i = i + pbOffset )
                inner pred flag[ x0 + i ][ y0 + j ]                    ae(v)
    } else {
    ...
    }
    ...
    }
}
```

Referring to Table 5, a syntax element inner_pred_flag may correspond to the inner prediction flag. That is, when the value of the syntax element inner_pred_flag is 1, the decoding device may derive the second prediction value of the current sample and may an improved intra prediction method according to the present invention. For example, the syntax element inner_pred_flag may be transmitted at the CU level and transmitted by the unit of the PU in the CU. That is, the syntax element inner_pred_flag may be transmitted as large as the number of PUs in the CU. One or a plurality of TUs may exist in one PU area and if the current block is the TU, information indicated by the syntax element inner_pred_flag of the PU may be applied to the TUs located in the PU area.

Figure 6:
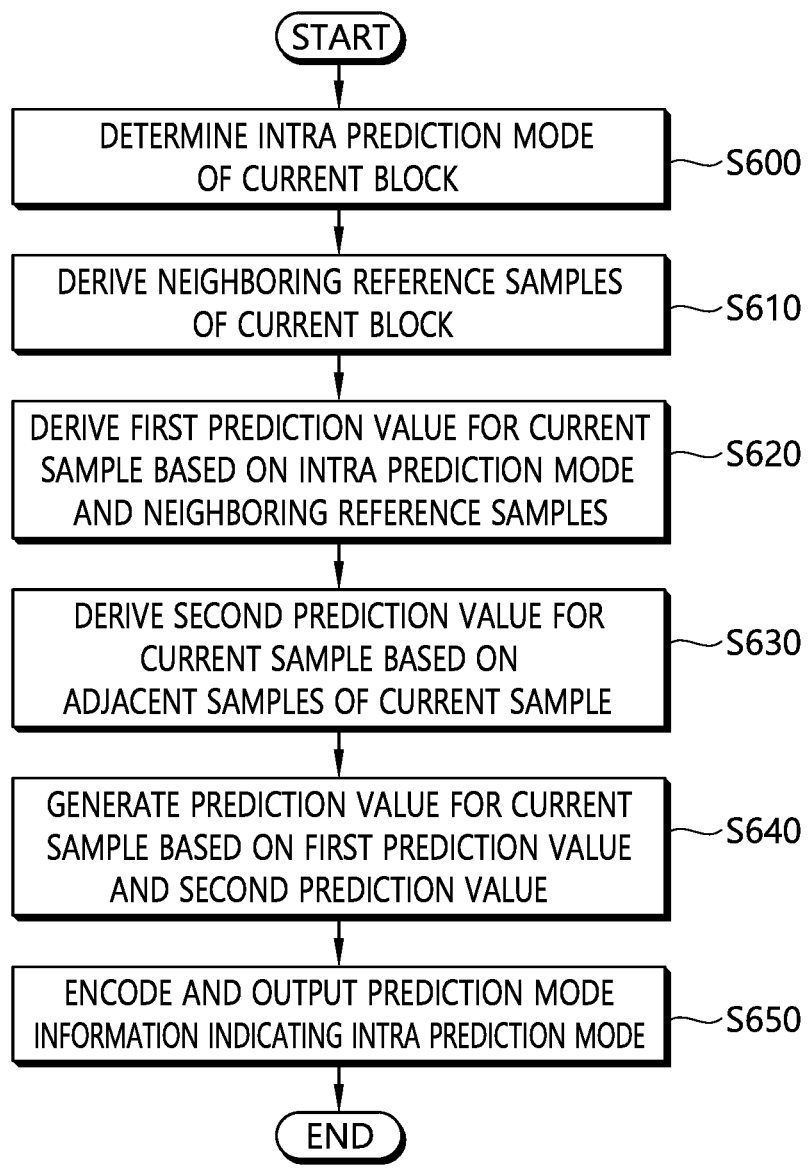
FIG. 6 schematically illustrates a video encoding method by an encoding device according to the present invention.

FIG. 6 schematically illustrates a video encoding method by an encoding device according to the present invention. The method disclosed in FIG. 6 may be performed by the encoding device disclosed in FIG. 1. Specifically, for example, S600 to S640 of FIG. 6 may be performed by the predictor of the encoding device and S650 may be performed by the entropy encoder of the encoding device.

The encoding device determines the intra prediction mode of the current block (S600). The encoding device may perform the prediction based on various prediction modes and may derive the intra prediction mode having optimal rate-distortion (RD) cost as the intra prediction mode for the current block.

The encoding device derives the neighboring samples of the current block (S610). The neighboring reference samples may include left neighboring samples, upper left neighboring samples, and upper neighboring samples of the current block.

For example, when a top-left sample position of the current block is regarded as (0, 0), left neighboring samples p[−1][2H−1], . . . , p[−1][0], an upper left neighboring sample p[−1][−1], and upper neighboring samples p[0][−1], . . . , p[2W−1][−1] may be derived. Herein, [m][n] may represent a sample (or pixel) of sample position (m,n). Herein, W and H may correspond to the width and a height of the current block, respectively.

The encoding device derives the first prediction value for the current sample based on the intra prediction mode and the neighboring reference samples (S620). The encoding device may derive the first prediction value for the current sample by using the neighboring reference samples of the current block according to the intra prediction mode. For example, when the intra prediction mode is a directional prediction mode, the first prediction value may be derived using a specific reference sample located in the prediction direction among the neighboring reference samples based on the current sample. Alternatively, when the intra prediction mode is a non-directional prediction mode, the first prediction value may be derived through an average or bi-directional interpolation of some of the neighbor reference samples.

The encoding device derives the second prediction value for the current sample based on the adjacent samples of the current sample (S630). The adjacent samples may include several samples adjacent to the current sample.

As one example, when the coordinate of the upper left sample position of the current block is (0, 0) and the coordinate of the sample position of the current sample is (x, y), the adjacent samples of the current sample may include the sample of the coordinate (x−1, y−1), the sample of the coordinate (x, y−1), and the sample of the coordinate (x−1, y). The second prediction value may be derived based on the adjacent samples. In this case, the second prediction value may be derived based on Equation 2 described above. When the adjacent samples are used, a raster scan order scheme may be applied to the reconstruction order of the samples in the current block. That is, the upper row in the current block is sequentially reconstructed to the lower row and the samples may be sequentially reconstructed from the left sample to the right sample in each row. Specifically, when the coordinate of the sample position of the current sample is (x, y), the sample of the coordinate (x−1, y−1) may be reconstructed earlier than the sample of the coordinate (x, y−1) and the sample of the coordinate (x, y−1) may be reconstructed earlier than the sample of the coordinate (x−1, y) among the adjacent samples. In this case, the reconstruction order may be shown in Table 1 above.

As another example, when the coordinate of the upper left sample position of the current block is (0, 0) and the coordinate of the sample position of the current sample is (x, y), the adjacent samples of the current sample may include the sample of the coordinate (x−1, y), the sample of the coordinate (x−1, y+1), and the sample of the coordinate (x, y+1). The second prediction value may be derived based on the adjacent samples. In this case, the second prediction value may be derived based on Equation 3 described above. When the adjacent samples are used, the samples in the current block may be sequentially reconstructed from the lower row in the current block to the upper row in the current block and may be sequentially reconstructed from the left sample to the right sample in each row. Specifically, when the coordinate of the current sample is (x, y), the sample of the coordinate (x−1, y+1) may be reconstructed earlier than the sample of the coordinate (x, y+1) and the sample of the coordinate (x, y+1) may be reconstructed earlier than the sample of the coordinate (x−1, y) among the adjacent samples. Such a reconstruction scheme may be referred to as the horizontally inversed raster scan order. In this case, the reconstruction order may be shown in Table 2 above.

As another example, when the coordinate of the upper left sample position of the current block is (0, 0) and the coordinate of the sample position of the current sample is (x, y), the adjacent samples of the current sample may include the sample of the coordinate (x, y−1), the sample of the coordinate (x+1, y−1), and the sample of the coordinate (x+1, y). The second prediction value may be derived based on the adjacent samples. In this case, the second prediction value may be derived based on Equation 4 described above. When the adjacent samples are used, the samples in the current block may be sequentially reconstructed from the upper row in the current block to the lower row in the current block and may be sequentially reconstructed from the right sample to the left sample in each row. Specifically, when the coordinate of the current sample is (x, y), the sample of the coordinate (x+1, y−1) may be reconstructed earlier than the sample of the coordinate (x, y−1) and the sample of the coordinate (x, y−1) may be reconstructed earlier than the sample of the coordinate (x+1, y) among the adjacent samples. Such a reconstruction scheme may be referred to as the vertically inversed raster scan order. In this case, the reconstruction order may be shown in Table 3 above.

As another example, when the coordinate of the upper left sample position of the current block is (0, 0) and the coordinate of the sample position of the current sample is (x, y), the adjacent samples of the current sample may include the sample of the coordinate (x, y−1), the sample of the coordinate (x+1, y−1), and the sample of the coordinate (x+1, y). The second prediction value may be derived based on the adjacent samples. In this case, the second prediction value may be derived based on Equation 5 described above. When the adjacent samples are used, the samples in the current block may be sequentially reconstructed from the lower row in the current block to the upper row in the current block and may be sequentially reconstructed from the right sample to the left sample in each row. Specifically, when the coordinate of the current sample is (x, y), the sample of the coordinate (x+1, y+1) may be reconstructed earlier than the sample of the coordinate (x, y+1) and the sample of the coordinate (x, y+1) may be reconstructed earlier than the sample of the coordinate (x+1, y) among the adjacent samples. Such a reconstruction scheme may be referred to as the inversed raster scan order. In this case, the reconstruction order may be shown in Table 4 above.

The adjacent samples may be samples which are located in the current block and reconstructed before the second prediction value for the current sample is derived.

In addition, the encoding device may generate the virtual reference samples based on the neighboring reference samples of the current block and make the virtual reference samples be included in the adjacent samples. Specifically, when the size of the current block is N×N and the coordinate of the upper left sample position of the current block is (0, 0), the virtual reference sample of coordinate (N, N), the virtual reference sample of coordinate (x, N), and the virtual reference sample of coordinate (N, y) may be generated based on the neighboring reference sample of coordinate (x, −1) and the neighboring reference sample of coordinate (−1, y). In this case, the virtual reference samples may be generated based on Equation 6 above.

Meanwhile, the encoding device may set an inner prediction flag indicating whether the first prediction value and the second prediction value are used for predicting the sample of the current block. For example, when the second prediction value is used or derived for intra prediction of the current block, the encoding device may set the value of the inner predictive flag to 1.

The encoding device generates the prediction value for the current sample based on the first prediction value and the second prediction value (S640). The prediction value for the current sample may be derived based on the weighted sum of the first prediction value and the second prediction value. The weight for deriving the prediction value for the current sample may be a fixed constant value or may have a different value depending on the intra prediction mode or the size of the current block. In this case, the prediction value for the current sample may be derived based on Equation 1 described above.

The encoding device encodes and outputs prediction mode information indicating the intra prediction mode (S650). The encoding device may entropy-encode the prediction mode information and output the entropy-encoded prediction mode information in the form of a bitstream. Further, the encoding device may generate and encode the inner prediction flag and output the inner prediction flag in the form of the bitstream. The prediction mode information and the inner prediction flag may be transmitted to the decoding device in the form of the bitstream. The bitstream may be transmitted to the decoding device via a network or a storage medium.

Although not illustrated, the encoding device may encode and output information on the residual samples for the current block. The information on the residual samples may include transform coefficients relating to the residual samples.

Figure 7:
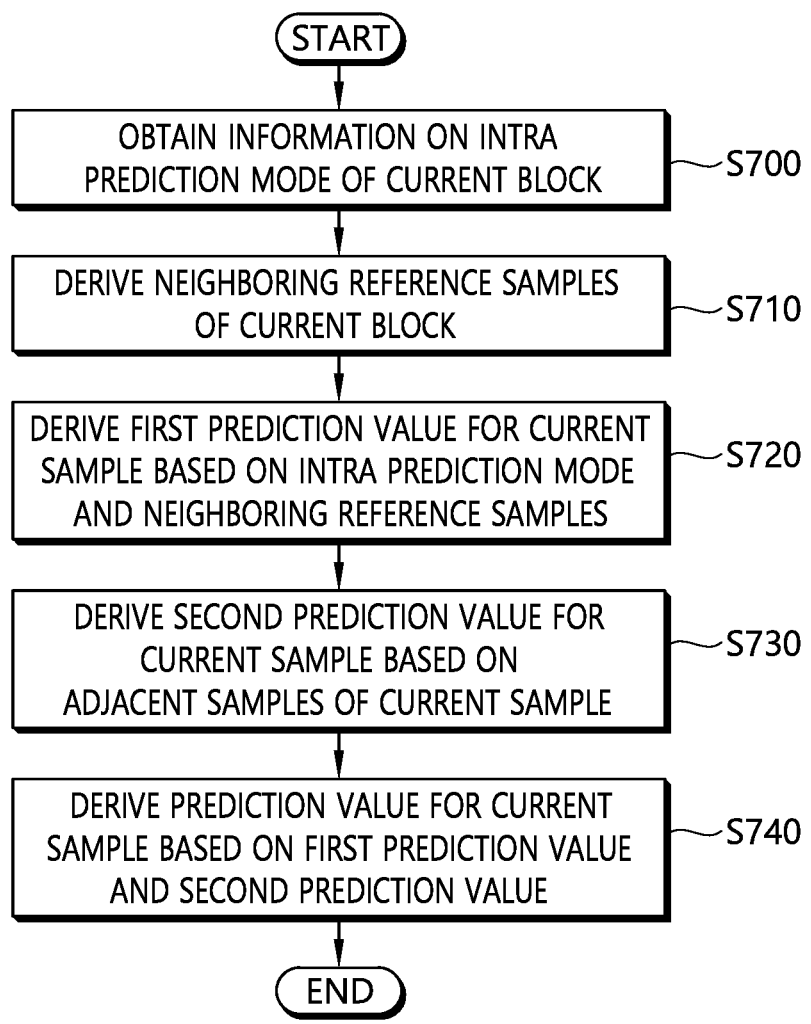
FIG. 7 schematically illustrates a video decoding method by a decoding device according to the present invention.

FIG. 7 schematically illustrates a video decoding method by a decoding device according to the present invention. The method disclosed in FIG. 7 may be performed by the decoding device disclosed in FIG. 2. Specifically, for example, S700 of FIG. 7 may be performed by the entropy decoder of the decoding device and S710 to S740 may be performed by the predictor of the decoding device.

The decoding device obtains information on the intra prediction mode of the current block (S700). The decoding device may decode the bitstream received from the encoding device and obtain the information on the intra prediction mode. The information on the intra prediction mode may include index information indicating the intra prediction mode. The bitstream may be received via the network or the storage medium. Further, the decoding device may receive the inner prediction flag through the bitstream. For example, the inner prediction flag may be received while being included in the syntax shown in Table 5 described above.

The decoding device derives the neighboring samples of the current block (S710). The neighboring reference samples may include left neighboring samples, upper left neighboring samples, and upper neighboring samples of the current block.

For example, when a top-left sample position of the current block is regarded as (0, 0), left neighboring samples p[−1][2H−1], . . . , p[−1][0], an upper left neighboring sample p[−1][−1], and upper neighboring samples p[0][−1], . . . , p[2W−1][−1] may be derived. Herein, [m][n] may represent a sample (or pixel) of sample position (m,n). Herein, W and H may correspond to the width and the height of the current block, respectively.

The decoding device derives the first prediction value for the current sample based on the intra prediction mode and the neighboring reference samples (S720). The decoding device may derive the first prediction value for the current sample by using the neighboring reference samples of the current block according to the intra prediction mode. For example, when the intra prediction mode is a directional prediction mode, the first prediction value may be derived using a specific reference sample located in the prediction direction among the neighboring reference samples based on the current sample. Alternatively, when the intra prediction mode is a non-directional prediction mode, the first prediction value may be derived through an average or bi-directional interpolation of some of the neighbor reference samples.

The decoding device derives the second prediction value for the current sample based on the adjacent samples of the current sample (S730). The adjacent samples may include several samples adjacent to the current sample.

As one example, when the coordinate of the upper left sample position of the current block is (0, 0) and the coordinate of the sample position of the current sample is (x, y), the adjacent samples of the current sample may include the sample of the coordinate (x−1, y−1), the sample of the coordinate (x, y−1), and the sample of the coordinate (x−1, y). The second prediction value may be derived based on the adjacent samples. In this case, the second prediction value may be derived based on Equation 2 described above. When the adjacent samples are used, the reconstruction order of the samples in the current block may be based on the raster scan order. That is, the upper row in the current block is sequentially reconstructed to the lower row and the samples may be sequentially reconstructed from the left sample to the right sample in each row. Specifically, when the coordinate of the sample position of the current sample is (x, y), the sample of the coordinate (x−1, y−1) may be reconstructed earlier than the sample of the coordinate (x, y−1) and the sample of the coordinate (x, y−1) may be reconstructed earlier than the sample of the coordinate (x−1, y) among the adjacent samples. In this case, the reconstruction order may be shown in Table 1 described above.

As another example, when the coordinate of the upper left sample position of the current block is (0, 0) and the coordinate of the sample position of the current sample is (x, y), the adjacent samples of the current sample may include the sample of the coordinate (x−1, y), the sample of the coordinate (x−1, y+1), and the sample of the coordinate (x, y+1). The second prediction value may be derived based on the adjacent samples. In this case, the second prediction value may be derived based on Equation 3 described above. When the adjacent samples are used, the samples in the current block may be sequentially reconstructed from the lower row in the current block to the upper row in the current block and may be sequentially reconstructed from the left sample to the right sample in each row. Specifically, when the coordinate of the current sample is (x, y), the sample of the coordinate (x−1, y+1) may be reconstructed earlier than the sample of the coordinate (x, y+1) and the sample of the coordinate (x, y+1) may be reconstructed earlier than the sample of the coordinate (x−1, y) among the adjacent samples. Such a reconstruction scheme may be referred to as the horizontally inversed raster scan order. In this case, the reconstruction order may be shown in Table 2 described above.

As another example, when the coordinate of the upper left sample position of the current block is (0, 0) and the coordinate of the sample position of the current sample is (x, y), the adjacent samples of the current sample may include the sample of the coordinate (x, y−1), the sample of the coordinate (x+1, y−1), and the sample of the coordinate (x+1, y). The second prediction value may be derived based on the adjacent samples. In this case, the second prediction value may be derived based on Equation 4 described above. When the adjacent samples are used, the samples in the current block may be sequentially reconstructed from the upper row in the current block to the lower row in the current block and may be sequentially reconstructed from the right sample to the left sample in each row. Specifically, when the coordinate of the current sample is (x, y), the sample of the coordinate (x+1, y−1) may be reconstructed earlier than the sample of the coordinate (x, y−1) and the sample of the coordinate (x, y−1) may be reconstructed earlier than the sample of the coordinate (x+1, y) among the adjacent samples. Such a reconstruction scheme may be referred to as the vertically inversed raster scan order. In this case, the reconstruction order may be shown in Table 3 described above.

As another example, when the coordinate of the upper left sample position of the current block is (0, 0) and the coordinate of the sample position of the current sample is (x, y), the adjacent samples of the current sample may include the sample of the coordinate (x, y−1), the sample of the coordinate (x+1, y−1), and the sample of the coordinate (x+1, y). The second prediction value may be derived based on the adjacent samples. In this case, the second prediction value may be derived based on Equation 5 described above. When the adjacent samples are used, the samples in the current block may be sequentially reconstructed from the lower row in the current block to the upper row in the current block and may be sequentially reconstructed from the right sample to the left sample in each row. Specifically, when the coordinate of the current sample is (x, y), the sample of the coordinate (x+1, y+1) may be reconstructed earlier than the sample of the coordinate (x, y+1) and the sample of the coordinate (x, y+1) may be reconstructed earlier than the sample of the coordinate (x+1, y) among the adjacent samples. Such a reconstruction scheme may be referred to as the inversed raster scan order. In this case, the reconstruction order may be shown in Table 4 described above.

The adjacent samples may be samples which are located in the current block and reconstructed before the second prediction value for the current sample is derived. In addition, the decoding device may generate the virtual reference samples based on the neighboring reference samples of the current block and make the virtual reference samples be included in the adjacent samples. Specifically, when the size of the current block is N×N and the coordinate of the upper left sample position of the current block is (0, 0), the virtual reference sample of coordinate (N, N), the virtual reference sample of coordinate (x, N), and the virtual reference sample of coordinate (N, y) may be generated based on the neighboring reference sample of coordinate (x, −1) and the neighboring reference sample of coordinate (−1, y). In this case, the virtual reference samples may be generated based on Equation 6 described above. Meanwhile, when the value of the inner prediction flag is equal to 1, the decoding device may derive the second prediction value for the current block.

The decoding device derives the prediction value for the current sample based on the first prediction value and the second prediction value (S740). The prediction value for the current sample may be derived based on the weighted sum of the first prediction value and the second prediction value. The weight for deriving the prediction value for the current sample may be a fixed constant value or may have a different value depending on the intra prediction mode or the size of the current block. In this case, the prediction value for the current sample may be derived based on Equation 1 described above.

The decoding device may generate the reconstruction sample for the current sample based on the prediction value. The decoding device may obtain the residual signal from the bitstream received from the encoding device and generate the residual sample for the current sample. In this case, the decoding device may generate the reconstruction sample for the current sample based on the prediction sample and the residual sample. The decoding device may generate a reconstruction picture based on the reconstruction sample.

According to the present invention, the intra prediction value can be derived based on the neighboring samples of the current sample in the current block, thereby enhancing the intra prediction accuracy.

Further, according to the present invention, the intra prediction value derived based on the neighboring samples can be obtained, thereby eliminating or reducing a data amount of the residual signal for a sample far from the neighboring reference samples and enhancing overall coding efficiency.

In addition, according to the present invention, the reconstruction order of the samples in the current block can be changed according to the intra-block intra-prediction method and the intra-prediction efficiency can be enhanced.

Moreover, according to the present invention, the virtual reference samples can be generated and the virtual reference samples are included as the neighboring samples of lower or right samples in the current block to enhance the intra prediction efficiency.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The above-described method according to the present invention may be implemented in a software form. The encoder and/or decoder according to the present invention may be included in a device that performs image processing in, a for example, TV, a computer, a smart phone, a set-top box, a display device, and the like.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An image decoding method performed by a decoding device, comprising:
acquiring the information on an intra-prediction mode of a current block from a received bit stream;
deriving neighboring reference samples of the current block;
deriving a first prediction value for a current sample of the current block based on the intra-prediction mode and the neighboring reference samples;
deriving a second prediction value for the current sample based on adjacent samples of the current sample; and
deriving a prediction value for the current sample based on the first prediction value and the second prediction value,
wherein the image decoding method further comprising:
generating virtual reference samples for deriving the second prediction value,
at least one of the adjacent samples is included in the virtual reference samples, and
when a size of the current block is N×N and the coordinate of the upper left sample position of the current block is (0, 0),
the virtual reference samples prediction value are derived based on the following equation, $$BR = (A_{2N-1} + L_{2N-1})/2$$

$$B_x = L_N + \text{diff}_B \cdot (x+1), \text{diff}_B = \frac{BR - L_N}{(N+1)}$$

$$R_y = A_N + \text{diff}_R \cdot (y+1), \text{diff}_R = \frac{BR - A_N}{(N+1)}$$

where BR represents the virtual reference sample of coordinate (N, N), Bx represents the virtual reference sample of coordinate (x, N), Ry represents the virtual reference sample of coordinate (N, y), Ax represents a neighboring reference sample of coordinate (x, −1), and Ly represents the neighboring reference sample of coordinate (−1, y).

2. The decoding method of claim 1, wherein the prediction value for the current sample is derived based on a weighted sum of the first prediction value and the second prediction value.

3. The decoding method of claim 2, wherein the prediction value is derived based on the following equation, $$\alpha * P_{conv} + (1-\alpha) * P_{inner} = P_{new}$$

where $P_{conv}$ represents the first prediction value, $P_{inner}$ represents, the second prediction value, $P_{new}$ represents the prediction value, and a represents a weight.

4. The decoding method of claim 1, wherein when a coordinate of an upper left sample position of the current block is (0, 0) and the coordinate of a sample position of the current sample is (x, y), the adjacent samples of the current sample includes a sample of coordinate (x−1, y−1), a sample of coordinate (x, y−1), and a sample of coordinate (x−1, y).

5. The decoding method of claim 4, wherein the adjacent samples are located in the current block and the adjacent samples are reconstructed before the second prediction value for the current sample is derived.

6. The decoding method of claim 4, wherein the second prediction value is derived based on the following equation, $$P_{innerA}(x,y)=(A_a*Rec(x-1,y-1)+A_b*Rec(x,y-1)+A_c*Rec(x-1,y)+(A_a+A_b+A_c)/2)/(A_a+A_b+A_c)$$

where $P_{innerA}$(x, y) represents the second prediction value for the current sample of the coordinate (x, y) in the current block, and Rec(x−1, y−1), Rec(x, y−1), and Rec(x−1, y) represent a reconstruction value of the sample of the coordinate (x−1, y−1), the reconstruction value of the sample of the coordinate (x, y−1), and the reconstruction value of the sample of the coordinate (x−1, y), respectively and $A_a$, $A_b$, and $A_c$ represent the weights for deriving the second prediction value.

7. The decoding method of claim 1, wherein when the coordinate of the upper left sample position of the current block is (0, 0) and the coordinate of the sample position of the current sample is (x, y), the adjacent samples of the current sample include the sample of the coordinate (x−1, y), the sample of the coordinate (x−1, y+1), and the sample of the coordinate (x, y+1), and
the samples in the current block are sequentially reconstructed from a lower row in the current block to an upper row in the current block and sequentially reconstructed from a left sample to a right sample in each row.

8. The decoding method of claim 7, wherein the second prediction value is derived based on the following equation, $$P_{innerB}(x,y)=(B_a*Rec(x-1,y)+B_b*Rec(x-1,y+1)+B_c*Rec(x,y+1)+(B_a+B_b+B_c)/2)/(B_a+B_b+B_c)$$

where $P_{innerB}(x, y)$ represents the second prediction value for the current sample of the coordinate (x, y) in the current block, and Rec(x−1, y), Rec(x−1, y+1), and Rec(x, y+1) represent the reconstruction value of the sample of the coordinate (x−1, y), the reconstruction value of the sample of the coordinate (x−1, y+1), and the reconstruction value of the sample of the coordinate (x, y+1), respectively and $B_a$, $B_b$, and $B_c$ represent the weights for deriving the second prediction value.

9. The decoding method of claim 1, wherein when the coordinate of the upper left sample position of the current block is (0, 0) and the coordinate of the sample position of the current sample is (x, y), the adjacent samples of the current sample include the sample of the coordinate (x, y−1), the sample of the coordinate (x+1, y−1), and the sample of the coordinate (x+1, y), and the samples in the current block are sequentially reconstructed from the upper row in the current block to the lower row in the current block and sequentially reconstructed from the right sample to the left sample in each row.

10. The decoding method of claim 9, wherein the second prediction value is derived based on the following equation, $$P_{innerC}(x,y)=(C_a*Rec(x,y-1)+C_b*Rec(x+1,y-1)+C_c*Rec(x+1,y)+(C_a+C_b+C_d/2)/(C_a+C_b+C_c)$$

where $P_{innerC}(x, y)$ represents the second prediction value for the current sample of the coordinate (x, y) in the current block, and Rec(x, y−1), Rec(x+1, y−1), and Rec(x+1, y) represent the reconstruction value of the sample of the coordinate (x, y−1), the reconstruction value of the sample of the coordinate (x+1, y−1), and the reconstruction value of the sample of the coordinate (x+1, y), respectively and $C_a$, $C_b$, and $C_c$ represent the weights for deriving the second prediction value.

11. The decoding method of claim 1, wherein when the coordinate of the upper left sample position of the current block is (0, 0) and the coordinate of the sample position of the current sample is (x, y), the adjacent samples of the current sample include the sample of the coordinate (x+1, y), the sample of the coordinate (x, y+1), and the sample of the coordinate (x+1, y+1), and the samples in the current block are sequentially reconstructed from the lower row in the current block to the upper row in the current block and sequentially reconstructed from the right sample to the left sample in each row.

12. The decoding method of claim 11, wherein the second prediction value is derived based on the following equation, $$P_{innerD}(x,y)=(D_a*Rec(x+1,y)+D_b*Rec(x,y+1)+D_c*Rec(x+1,y+1)+(D_a+D_b+D_c)/2)/(D_a+D_b+D_c)$$

where $P_{innerD}(x, y)$ represents the second prediction value for the current sample of the coordinate (x, y) in the current block, and Rec(x+1, y), Rec(x, y+1), and Rec(x+1, y+1) represent the reconstruction value of the sample of the coordinate (x+1, y), the reconstruction value of the sample of the coordinate (x, y+1), and the reconstruction value of the sample of the coordinate (x+1, y+1), respectively and $D_a$, $D_b$, and $D_c$ represent the weights for deriving the second prediction value.

13. The decoding method of claim 1, further comprising:
receiving an inner prediction flag through the bitstream,
when a value of the inner prediction flag is 1, the second prediction value is derived.

14. An image encoding method performed by an encoding device, comprising:
determining an intra prediction mode of a current block;
deriving neighboring reference samples of the current block;
deriving a first prediction value for a current sample based on the intra-prediction mode and the neighboring reference samples;
deriving a second prediction value for the current sample based on adjacent samples of the current sample;
deriving a prediction value for the current sample based on the first prediction value and the second prediction value; and
encoding and outputting prediction mode information indicating the intra prediction mode for the current block,
wherein the image encoding method further comprising:
generating virtual reference samples for deriving the second prediction value,
at least one of the adjacent samples is included in the virtual reference samples, and
when a size of the current block is N×N and the coordinate of the upper left sample position of the current block is (0, 0),
the virtual reference samples prediction value are derived based on the following equation, $$BR = (A_{2N-1} + L_{2N-1})/2$$
$$B_x = L_N + diff_B \cdot (x+1), diff_B = \frac{BR - L_N}{(N+1)}$$
$$R_y = A_N + diff_R \cdot (y+1), diff_R = \frac{BR - A_N}{(N+1)}$$

where BR represents the virtual reference sample of coordinate (N, N), Bx represents the virtual reference sample of coordinate (x, N), Ry represents the virtual reference sample of coordinate (N, y), Ax represents a neighboring reference sample of coordinate (x, −1), and Ly represents the neighboring reference sample of coordinate (−1, y).

* * * * *